United States Patent [19]
Puklus, Jr.

[11] 3,878,757
[45] Apr. 22, 1975

[54] AUTOMATIC LOCKING SLIDING NUT

[76] Inventor: William V. Puklus, Jr., 3200 Temple, Los Angeles, Calif. 90026

[22] Filed: Apr. 2, 1973

[21] Appl. No.: 346,784

[52] U.S. Cl.................................... 85/32 V; 85/33
[51] Int. Cl............................................. F16b 37/08
[58] Field of Search............................. 85/33, 32 V

[56] References Cited
UNITED STATES PATENTS
| | | | |
|---|---|---|---|
| 1,589,307 | 6/1926 | Svebilius | 85/33 |
| 2,261,537 | 11/1941 | Zamarra | 85/32 V |

FOREIGN PATENTS OR APPLICATIONS
| | | | |
|---|---|---|---|
| 1,113,993 | 12/1955 | France | 85/33 |

*Primary Examiner*—Edward C. Allen
*Attorney, Agent, or Firm*—Harris, Kern, Wallen & Tinsley

[57] ABSTRACT

A slidable nut for engaging a threaded shaft in either an axially slidable or conventional thread engagement mode and including means for automatically locking the nut in the thread engagement mode when the shaft is in a generally vertical position and a load-bearing surface of the nut is substantially normal thereto, the automatic locking means including a shoulder extending upwardly from the load-bearing surface and a flat washer around the shaft for locking engagement between the shoulder and the shaft.

1 Claim, 5 Drawing Figures

AUTOMATIC LOCKING SLIDING NUT

My invention relates to fasteners useful in the building construction industry and, more particularly, to such fasteners of a slide-nut type.

It is common practice today in the commerical building industry to provide overhead suspension of building mechanicals such as air ducting, plumbing and electrical conduits as well as various machinery therefore. Such suspension is usually provided by long threaded shafts or rods, nuts, and cross-connecting members or straps. The threaded shafts are secured to the bottom of floor constructions during the formation thereof, as during the pouring of concrete slabs, to extend downwardly to receive the nuts and straps connected to and supporting the various building mechanicals. Such an arrangement permits vertical adjustment of the mechanicals by turning of the nuts on the shafts.

Quite typically in building construction, the threaded shafts needed for overhead suspension assemblies are handled in a manner quite like ordinary concrete reinforcing bars. Thus, it is not uncommon for such threaded shafts to be run over or into by fork lifts and other equipment and the threads thereof damaged. Further, in building construction, after the threaded shafts are secured to the floor structures, the shafts are cut to desired common lengths with adjacent shafts supporting common equipment. This usually results in damage to the endmost threads of the shafts. Because of the thread damage caused by mishandling of the threaded shafts, and the cutting of the ends thereof, it is not generally possible to thread conventional nuts onto and up the length of such shafts. Accordingly, it has become a common practice in the commercial building industry for a workman to rethread the end of each shaft to receive conventional nuts. This is time consuming and considering today's wages, represents a significant building expense. Further, even after the shafts have been rethreaded, it is a time consuming operation to thread a nut on the shaft and up to a position where it is to provide vertical support for a building mechanical.

Recognizing the foregoing problems, it was my thought to provide a nut capable of sliding quickly over the damaged threads and up to a point adjacent the mechanical to be supported and then tilting into a thread engaging mode to turn in a conventional manner on the shaft and into contact with supports for a building mechanical.

Upon developing and experimenting with such a slidable or slide nut, I found that it overcame all problems created by bent shafts and damaged threads, eliminated the need to rethread cut shaft ends and enabled workmen to quickly attach and thread nuts onto vertically extending threaded shafts and into supporting contact with building mechanicals. However, I further found that in tightening such nuts against building mechanicals and supports therefor, there was a tendency for the nuts to rock on the shafts and become disengaged therefrom. This was particularly a problem when the mechanical was heavy and when there was any tendency for the shaft itself to bend upon a tightening of the nut.

Accordingly, it is a principal object of my present invention to provide a slide nut of the foregoing character with automatic locking means for retaining it in a threadengaging mode once tilted thereto until it is desired to manually release the nut from such a mode of operation.

A further object of my present invention is to provide such a slide nut wherein the automatic locking means will releasably lock the nut in the thread-engaging mode with a load-bearing surface of the nut substantially normal to the axis of the supporting threaded shaft.

Still another object of my present invention is to provide a slide nut of the foregoing character wherein the automatic locking means includes a nut-locking member for riding on the shaft above the nut and a projection from a bearing surface of the nut, the nut-locking member falling onto the nut and being releasably captured between the projection and an edge of the threaded shaft as the nut is tilted into the thread-engaging mode.

A still further object of my present invention is to provide a slide nut of the foregoing character wherein the nut-locking means is a washer and the projection is a shoulder extending from the bearing surface of the nut, the washer having a width substantially equal to the radial distance between the edge of the shaft and a washer contacting surface of the shoulder.

The foregoing objects and features of the present invention may be more clearly understood by reference to the following detailed description when considered with the drawing which, by way of example only, illustrates one form of an automatically locking slide nut embodying the features of my present invention.

Figure 4:
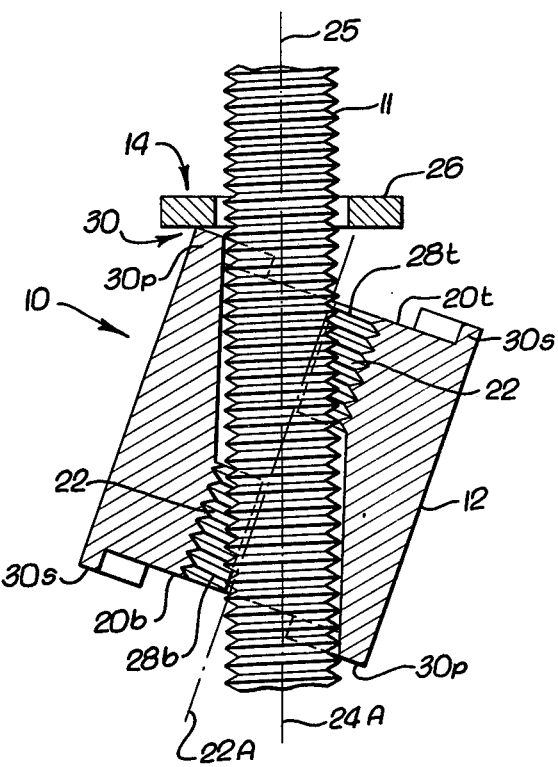
Figure 5:
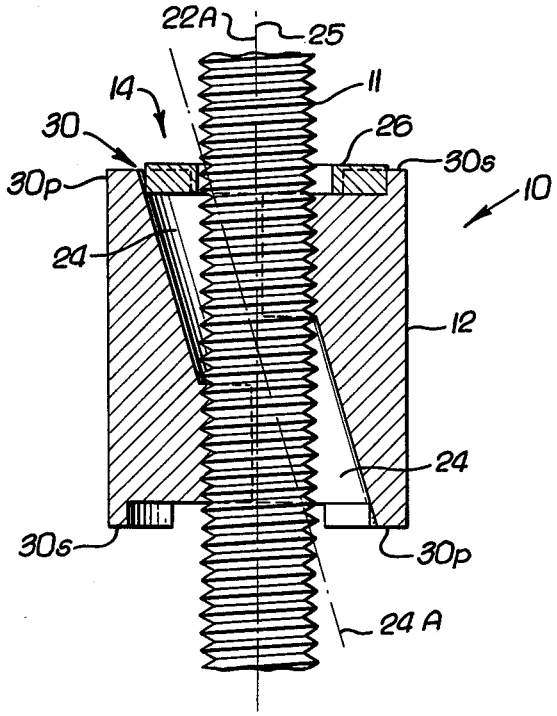

FIG. 4 is a cross-sectional side view of my slide nut in a sliding mode on a threaded shaft with the nut-locking member riding on the shaft above the nut; and FIG. 5 is a cross-sectional side view similar to FIG. 4 illustrating my slide nut in the thread-engaging mode or position with the nut-locking member captured on the load-bearing surface of the nut between a projection and an edge of the threaded shaft.

In the drawing, my automatically locking slide nut is designated by the numeral 10. It is designed to operate in two different modes. In one mode of operation, the nut 10 will slide along a vertically positioned threaded shaft 11 (see FIG. 4). In the other mode of operation, the nut 10 will engage and automatically lock into thread engagement with the shaft 11 and function as a typical threaded nut and threaded shaft combination (see FIG. 5). The nut 10 is hand shiftable between the two modes of operation.

Generally speaking, to provide for the two modes of operation including automatic locking in thread engagement with the shaft 11, the nut of my invention includes a generally cylindrical nut body 12 and an automatic locking means 14. The nut body 12 includes a partially threaded hole 16 having an enlarged open end 18 in a load-bearing surface 20t of the nut. The partially threaded hole 16 is defined by a threaded hole 22 and an intersecting nonthreaded hole 24. The threaded hole 22 is dimensioned to axially receive and mate with the shaft 11 when the nut is in a first or thread engaging position or mode with a longitudinal axis 22A of the threaded hole and nut substantially coaxial with a longitudinal axis 25 of the shaft (FIG. 5). The nonthreaded hole 24 intersects the threaded hole 22 at an acute angle and is dimensioned to slidably receive the shaft 11 when the nut is in a tilted or second position or mode with the axis 25 of the shaft substantially coaxial with a longitudinal axis 24A of the nonthreaded hole 24 (FIG. 4). Thus, with the nut 10 in the tilted or second position, it may be easily and quickly moved by hand up or down the shaft 11 as desired to a position adjacent an object it is desired to support relative to the shaft. Then, the nut body 12 may be tilted by hand to the thread-engaging position and tightened against the object in a conventional manner by turning the nut on the shaft.

In my present invention, it is an important feature that the nut be automatically and releasably locked in the threaded-engaging position to prevent undesired disengaging of the nut as it is tightened against the object. This is accomplished by the automatic locking means 14. Generally speaking, the automatically locking means comprises a nut-locking member 26 for riding on the shaft 11 above the nut body 12 as the nut is moved vertically on the shaft in the tilted position (see FIG. 4). Further, the nut-locking member 26 is designed to drop into a locking position on the bearing surface of the nut and against an edge of the threaded shaft when the nut is tilted to the thread-engaging position (see FIG. 5).

Figure 1:
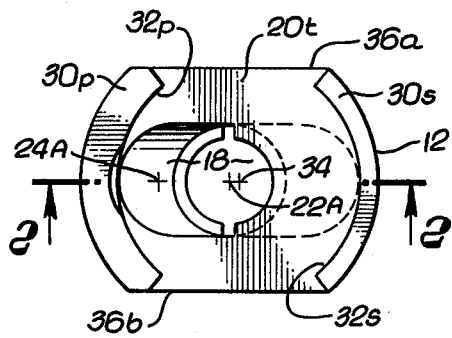
FIG. 1 is a top view of my automatically locking slide nut.
Figure 2:
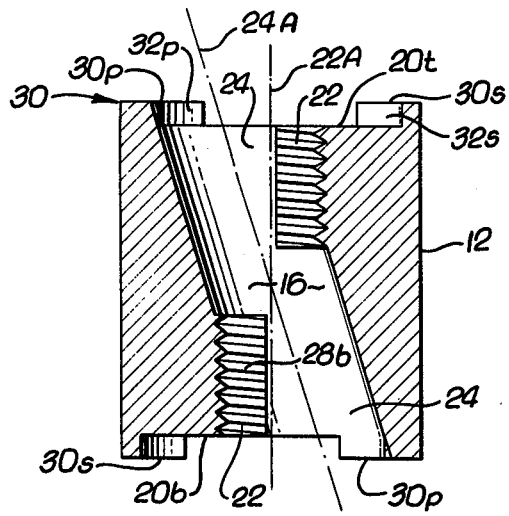
FIG. 2 is a cross-sectional side view of my slide nut taken along the line 2—2 in FIG. 1.

In more specific detail, and referring to FIGS. 1 and 2 of the drawing, the nut body 12 of the slide nut 10 is generally cylindrical and includes load-bearing surfaces 20t and 20b located on opposite ends of the nut body 12. The surfaces 20t and 20b are parallel to each other and perpendicular to the nut body axis 22A.

As previously stated, the nut body 12 includes the threaded and nonthreaded holes 22 and 24 respectively. The holes 22 and 24 and the axes 22A and 24A thereof are uniquely positioned so as to intersect at an acute angle and thus compositely form the larger and only partially threaded hole 16. The ends of holes 22 and 24 merge into enlarged openings 18 of generally elliptical shape in load-bearing surfaces 20t and 20b. Sufficient clearances are provided within the partially threaded hole 16 to enable the nut body 12 to be alternately shifted between its first and second positions of thread engagement and nonthread engagement respectively with the shaft 11. As most clearly shown in FIG. 2 the threads defined by threaded hole 22 are not continuously formed between the end-bearing surfaces 20t and 20b but are formed in segments 28t and 28b which are axially displaced along and on opposite sides of axis 22A. Although displaced, the segments 28t and 28b are in functional register with each other so as to enable their full and simultaneous engagement with the shaft 11 without causing a binding of the nut body 12. Also, as most easily observed in FIGS. 1 and 3 the segments 28t and 28b engage somewhat less than 50 percent of the peripheral surface of the threaded shaft 11. This allows the nut to tilt between the first and second positions without binding.

In the preferred embodiment as shown in the drawing, the nut body 12 further includes two parallel and opposing flat side surfaces 36a and 36b. The surfaces are generally equidistant from and parallel to the nut body axis 22A and are displaced from each other so as to accommodate reception of the nut body in the fixed opening of a conventional open-end wrench which may be used to turn the nut. As will be described in further detail, the determination of the distance between surfaces 36a and 36b should also take into consideration the proportions of the elements comprising the automatic locking means 14.

Various forms of automatic locking means may be employed in my invention to provide the desired automatic locking feature. The drawing however illustrates a preferred form of such means including a washer as the nutlocking member 26 in combination with retaining means 30 on the bearing surface 20t. Preferably the retaining means comprises a pair of annular shoulders 30p and 30s on loadbearing surface 20t. A similar pair of shoulders may be included on the bearing surface 20b as illustrated. The height and symmetry of each pair are identical relative to its respective bearing surface and the passageway opening therein to allow either surface to act as an upper surface of the nut as desired. An inner surface 32p of shoulder 30p and the inner surface 32s of the shoulder 30s are generally perpendicular to the bearing surface 20t and is arcuately formed on a radius 33. The radius 33 is substantially equal to the outer radius of the washer 26 and is centered on an axis 34 parallel to the axis 22A of the threaded hole 22 and displaced from the axis 22A in a direction away from the retaining shoulder 30p. Here, the amount of displacement is approximately equal to the radial clearance between the threaded shaft 11 and the washer 26 in combination. Thus, when the nut body 12 is tilted on the shaft 11 to the position shown in FIG. 5, the washer 26 is able to drop onto the bearing surface 20t with the surface 32p of the shoulder 30p bearing against the outer peripheral edge of the washer and the threaded shaft bearing against the inner peripheral edge of the washer. Thus engaged, a segment of the washer 26 forms a wedge and prohibits further angulation or tilting of the slide nut (see FIGS. 3 and 5).

The washer 26 of the automatically locking slide nut is a washer only in the preferred form of the invention. It is to be understood that the axial dimension or thickness of the washer, may be increased to develop more cylindrical proportions without departing from the spirit of the invention in an automatically locking slide nut. However, the washer 26 should be of sufficient rigidity to preclude deformation. Further, it is preferable that the washer be thicker than the spacing of the threads on the shaft 11. This will insure that in the locking mode the inner peripheral edge of the washer will bear against the threaded shaft at its major diameter and not against a root area between adjacent threads where there might, under some circumstances, be sufficient play to allow the nut body to tilt and disengage hole 22.

Figure 3:
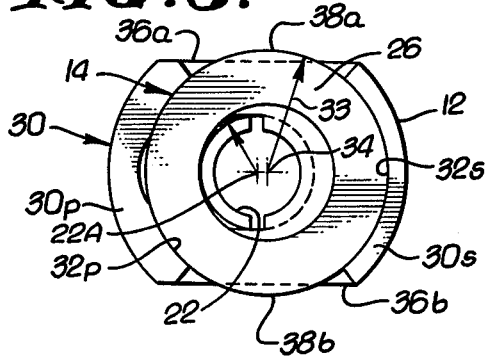
FIG. 3 is a top view of my slide nut with a locking member in place thereon.

The locking washer 26, as best shown in FIG. 3, has an over-all diameter greater than the distance between the opposing flat surfaces 36a and 36b of the nut body 12 thereby forming equally overhanging lips 38a and 38b. The amount of overhang is sufficient to provide clearance between the nut body and washer and thereby enable a workman to gain convenient fingertip purchase on the locking washer and to guide it away from its captured position by lifting it upward and away from the retaining shoulder 30p and the load-bearing surface 20t. Such repositioning of the washer 26 is necessary to unlock the slide nut and revert it to the slidable mode of translation when installed on a generally vertically supported shaft.

The fundamental operation of my automatically locking slide nut 10 can best be understood by comparing the relative positions of the nut body 12, the threaded shaft 11, and the locking washer 26 as shown in different relationships. The relationship of the aforementioned parts in FIGS. 4 defines a second tilted position where the nut body 12 is free to be positioned along the shaft 11 exclusive of thread-to-thread engagement wherein the smooth bore hole 24 is engaged with the shaft. The locking washer 26 is also shown in position as would be the case if the nut body 12 were to be moved in a translation along the shaft. FIG. 5 is a continuation of the description as set forth concerning FIG. 4 showing the nut body 12 in its first position having been shifted so as to engage its threaded hole 22 with the threads of the shaft. In response to the shifting of the nut body, the locking washer 26, under the influence of gravity, automatically assumes the captured position shown on the top-bearing surface 20t of the nut.

In a typical overhead installation, the locking washer 26 is simply positioned and retained on bearing surface 20t between the shoulder 30p and the shoulder 30s of the slide nut body 12. In a one-handed operation the combination of locking washer 26 and nut body 12 may be fitted in slidable contact to the lower end of a generally vertically suspended threaded shaft; then after translation to a desired position along the shaft, merely shifted to achieve a locked position with thread engagement. Thereafter, fine adjustments in either direction may be made, with or without a load applied as in the usual nut and threaded shaft relationship. If it should be desired to again enter the mode of slidable translation, the load only need be removed to gain sufficient clearance for purchase on and displacement of the locking washer 26 to enable subsequent tilting of the nut body 12.

Although the automatically locking slide nut is described herein as operating on a vertically supported shaft, my invention finds application to threaded shafts of any other orientation. In other orientations only the automatic feature of locking is diminished because of its dependence upon the force of gravity for actuation which is easily replaced with a similarly small hand-applied force to place and momentarily restrain the locking washer 26 in its functional position.

From the foregoing detailed description it is to be understood that the automatically locking slide nut of my present invention is an extremely simple and dependable fastener particularly well suited to use in building constructions where vertically suspended threaded shafts are used to support various building mechanicals. The incorporation of the automatic locking feature into the slide nut of my present invention renders my slide nut virtually insensitive to misalignments between the supported surface and the axis of the threaded shaft caused by load-induced localized bending and deformation of the supporting surface. The fundamental installation of the automatically locking slide nut of my present invention is performed without tools until load-depending torque demands require the use of a simple open-end wrench to establish the load at a final position. The amount of axial translation required by the turning of the nut in the thread-engaged mode will be necessarily limited because of the unique capability to accomplish larger axial translations in the virtually effortless slidable mode.

While a particular form of an automatically locking slide nut is described in some detail herein, it is appreciated that changes and modifications may be made in the illustrated form of the invention without departing from the spirit of the invention. Accordingly, it is intended that my present invention be limited in scope only by the terms of the following claims.

I claim:

1. An automatically locking slide nut comprising:

a nut including a partially threaded hole having an enlarged open end in a generally flat load-bearing surface thereof, said partially threaded hole being defined by a threaded hole for axially receiving and mating with a threaded shaft when said nut is in a first position with an axis of said shaft substantially coaxial with a longitudinal axis of said threaded hole, and a nonthreaded hole intersecting said threaded hole at an acute angle for axially and slidably receiving said shaft when said nut is in a tilted and second position with said axis of said shaft substantially coaxial with a longitudinal axis of said nonthreaded hole, said axes of said threaded and nonthreaded holes intersecting at said acute angle; and means for automatically locking said nut in said first position when said shaft is extending in a vertical direction, said automatic locking means including an annular washer having a generally flat bottom surface perpendicular to the washer axis with the outer edge of said washer parallel to the washer axis, with said washer dimensioned for riding on said threaded shaft with a bottom engaging an upper corner portion of said nut to move upwardly and downwardly with said nut as said nut is moved vertically on said shaft in said tilted position and for dropping by gravity into a locking position on said bearing surface and against said threaded shaft when said nut is tilted to said first position, said washer having a thickness greater than a spacing of the threads on said shaft, a central hole larger by a predetermined radial clearance than said shaft for loosely receiving said shaft, and a substantially circular outer edge, retaining means including a first shoulder extending upwardly from said bearing surface of said nut and having an inner arcuate surface parallel to the nut threaded hole axis for engaging said outer edge of said washer while a portion of an inner peripheral edge of said washer bears against said shaft to define a wedge between said shaft and said first shoulder to prohibit tilting of said nut from said first position, said inner arcuate surface of said first shoulder being formed on a radius substantially equal to an outer radius of said washer and extending from a center displaced by substantially said radical clearance from said londitudinal axis of said threaded hole away from said arcuate surface, and a second shoulder extending upwardly from said load-bearing surface opposite said first shoulder and including an arcuate surface formed on said radius forming said first mentioned arcuate surface.

* * * * *